June 30, 1970  J. L. ZAR  3,518,591
SUPERCONDUCTING MAGNET AND METHOD OF OPERATION
Filed Sept. 6, 1967
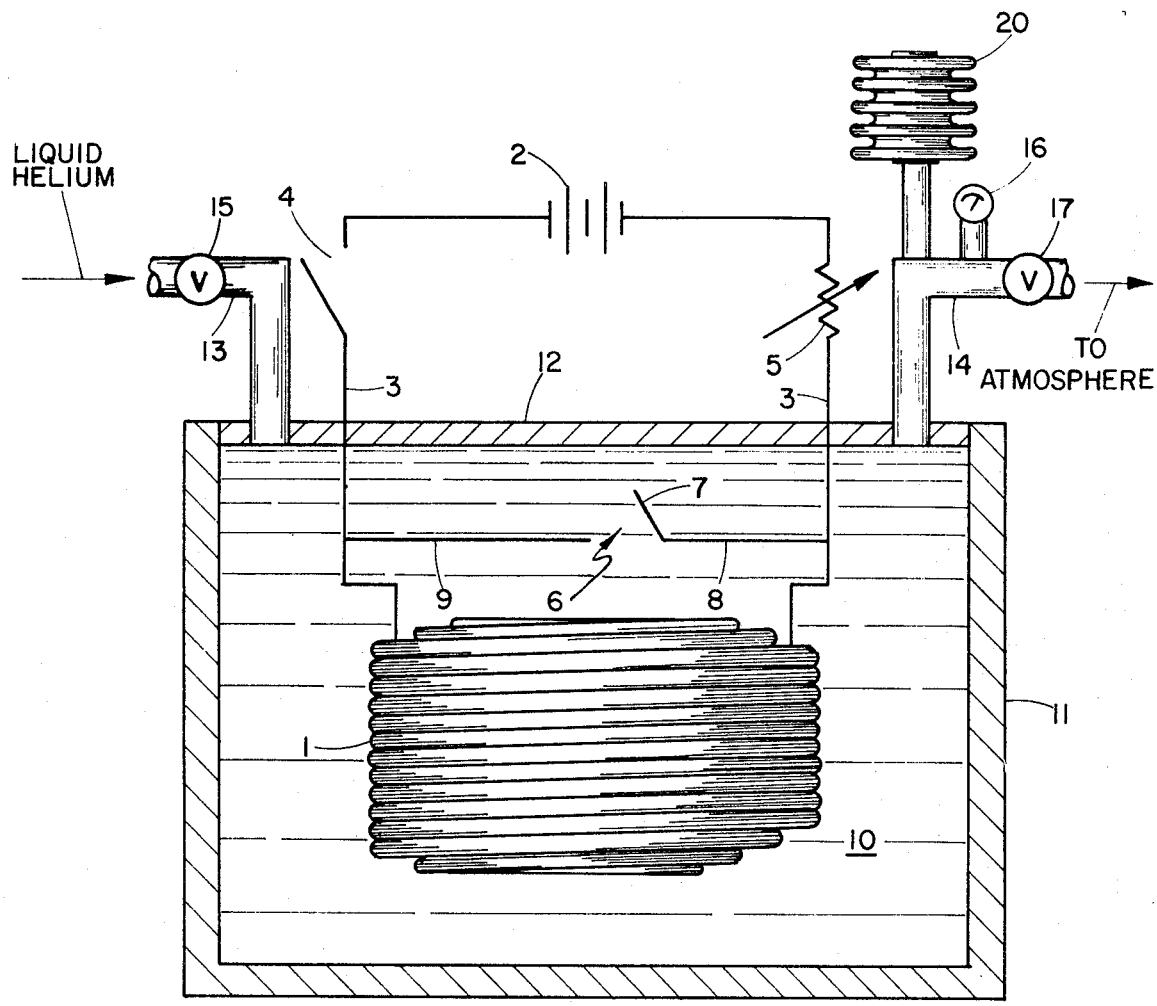
JACOB L. ZAR
INVENTOR.
BY Charles M. Hogan
Melvin E. Frederick
ATTORNEYS

United States Patent Office 3,518,591
Patented June 30, 1970

3,518,591
SUPERCONDUCTING MAGNET AND METHOD OF OPERATION
Jacob L. Zar, North Andover, Mass., assignor to Avco Corporation, Cincinnati, Ohio, a corporation of Delaware
Filed Sept. 6, 1967, Ser. No. 665,789
Int. Cl. H01f 7/22
U.S. Cl. 335—216
4 Claims

ABSTRACT OF THE DISCLOSURE

A method of and apparatus for operating superconducting magnets wherein the magnet is immersed in liquid helium disposed in a dewar and the dewar is closed to the surrounding atmosphere and the pressure therein maintained at a pressure greater than the critical pressure of liquid helium and preferably in the range of 2–3 atmospheres.

---

A superconducting magnet and method of operating same wherein the coil is immersed in a coolant such as liquid helium or the like contained in a suitable dewar, the conditions within the dewar being controlled in such a manner that boiling does not occur and, hence, there is no substantial distinction between the coolant in its liquid and gaseous phase, i.e., the coolant such as helium is maintained at or above its critical pressure.

This invention relates to superconducting magnets and more particularly to superconducting magnets and a method of operating same for providing high magnetic fields.

The ability to not only provide high-strength magnetic fields but to effectively and safely provide such magnetic fields over an extended period of time is important in connection with solid state, plasma and particle physics research. In most cases, heretofore, the need for high magnetic fields necessitated the use of pulsed fields or large amounts of power. However, with the advent of new superconducting materials, considerable interest has been aroused in the development of useful magnets of high field strength.

An example of the application of such magnets is the generation of electrical power, the generation of magnetic fields in outer space, plasma propulsion, large scale physics experiments and the like. Providing a continuous magnetic field of high field strength over a large volume is a formidable engineering task.

Broadly speaking, three types of field coils may be used to provide high-strength magnetic fields, namely, room temperature copper, cryogenic, and superconducting field coils. Until recently, the only practical way to produce high-strength magnetic fields was by using water-cooled copper field coils with or without iron cores. This type of field coil has large power requirements.

Since the resistivity of pure metals decreases with temperature, Joule loss in field coils can be reduced by refrigeration. Although this approach requires that power be supplied to the refrigerator, it has been shown that the total power consumed by the refrigerator and a cryogenic field coil can be substantially reduced over that required by a comparable copper magnet operating at room temperature. However, operation of the refrigerator still represents a significant loss because Joule losses still exist in the coil.

Recent developments in high critical-field superconductors have made possible the consideration of high field-strength superconducting field coils. The possibility of using superconductor field coils for providing 100 kilogauss or more with only minute refrigeration power requirements and no Joule losses represents obvious advantages for continuously operating power plants and the like.

The properties and characteristics of superconductors have been treated in such texts as "Superfluids," vol. 1, by Fritz London, published in 1950 in New York by John Wiley & Son, Inc. and "Superconductivity" by D. Shoenberg, published in 1952 in London by Cambridge University Press.

It has been known for many years that the resistance of metals decreases as a function of decreasing temperature until a given temperature of the order of 18° K. or below is reached, at which temperature electrical resistance very sharply vanishes for those materials which exhibit superconductivity. The temperature at which transition to zero resistance takes place in metals is referred to as the critical temperature and the state of a metal upon reaching zero resistance is referred to as the superconductive state. A metal or material that does not or cannot be made to exhibit zero resistance may be referred to as a nonsuperconductor or normal material.

The critical temperature of materials varies with different materials and for each material it is lowered as the intensity of the magnetic field around the material is increased from zero. Once a body of material is rendered superconductive, it may be restored to the resistive or normal state without changing its temperature by the application of a magnetic field of a given intensity to such materials. The magnetic field necessary to destroy superconductivity is called the critical field. Further, at a given magnetic field strength and temperature, a superconductive material may also be driven into its normal state by passing a current of a given magnitude through the material. The current necessary to destroy superconductivity is called the critical current.

Thus, superconductivity in a specific material may be destroyed by the application of energy to it in the form of heat so as to make such material reach its critical temperature, or in the form of a magnetic field so as to make it reach its critical field, or in the form of current so as to make it reach its critical current. It is important that one keep in mind that the critical temperature, field and current, are all interdependent.

Practical examples of superconducting materials to attain high fields are the compounds $Nb_3Sn$ and $V_3Ga$, alloys of niobium with zirconium, and alloys of niobium and titanium.

As used herein, the term "superconducting temperature of application" means the temperature at which a coil which exhibits superconducting characteristics is maintained during operation, the term "superconducting material" means a material that does or can be made to exhibit zero resistance, i.e., it has a useful and known critical temperature greater than the superconducting temperature of application, and the term "normal material" means a material that does not or cannot be made to exhibit zero resistance at the superconducting temperature of application.

It is an object of the invention to provide an improved superconducting magnet.

It is another object of the invention to provide a superconducting magnet having improved operating characteristics.

It is a further object of the invention to provide an improved method of operating superconducting magnets.

It is a still further object of the invention to provide an improved method of operating superconducting magnets immersed in helium wherein the helium is maintained at or above its critical pressure whereby there is no substantial distinction between the helium in liquid form and the helium in gaseous form.

It is a still further object of the invention to provide a superconducting magnet and method of operating same not subject to vapor binding in cooling passages that may be provided in the coil and/or liquid level problems in zero gravity situations.

The invention, both as to its organization and method of operation, will best be understood from the following description of specific embodiments when read in conjunction with the accompanying drawings which is a front elevational view partly in section of a superconducting magnet and is illustrative of one embodiment of the invention wherein the pressure inside the dewar which is to say that surrounding the coil is maintained at or above the critical pressure of the coolant, i.e., at a pressure sufficient that boiling does not occur.

Referring now to the drawing, there is shown a superconducting coil 1, connected to an external power source, such as battery 2, by means of leads 3, switch 4 and variable resistor 5. Resistor 5 permits the current to be varied if desired. Shunt 6 comprising switch 7 and leads 8 and 9 are connected across the terminals of coil 1. Coil 1 and shunt 6 are maintained at a temperature below the critical temperature of the superconducting material in coil 1 and shunt 6 by suspending them in a low temperature environment 10, such as helium, more fully described hereinafter, contained in a sealable dewar flask 11.

Coil 1 may be formed of a superconductive wire material exhibiting the required critical field and superconductor characteristics for the intended use. Advantageously, superconducting coils are formed of a single strand of a superconducting wire. The considerations dictating the choice of the material for leads 3 are understood by the art. In general, those portions of leads 3 from shunt 6 to coil 1 are formed of a suitable superconducting wire material capable of sustaining the same current flow as the coil. Those portions of leads 3 from the external power source 4 to shunt 6 not suspended in the low temperature environment are advantageously formed of a low resistance material, such as copper, which exhibits a lower resistance than the typical superconducting material in a normal state. Persistent current may be established in coil 1 by opening switch 7 and closing switch 4 and varying resistor 5 to establish the desired current flow through coil 1. Thereafter, closing switch 7 and opening switch 4 will result in the establishment of a persistent current through the coil 1, shunt 6 and the interconnected portions of leads 3.

Directing attention now to dewar flask 11, it will be noted that the upper portion thereof is sealed by a cover plate 12 having openings to receive a coolant inlet or fill pipe 13 and a venting or relief pipe 14. Coolant inlet pipe 13 is provided with a regulating valve 15 and is coupled to a source of coolant (not shown). Venting pipe 14 is provided with a conventional pressure gauge 16 and a regulating valve 17. Venting pipe 14 provides communication between the interior of dewar flask 11 and the atmosphere so that the desired pressure may be maintained in the dewar. It will now be seen that by means of pipes 13 and 14 and regulating valves 15 and 17 a controlled pressure may be provided within dewar flask 11.

In accordance with the invention, during operation dewar flask 11 is sealed to the ambient atmosphere, filled at least to a level in excess of shunt 6 and valves 15 and 17 adjusted to provide a pressure within dewar flask 11 sufficient to prevent boiling, i.e., provide a pressure at or above the critical pressure of the coolant.

In space applications where the effects of gravity are absent or its direction is not predictable, there is no assurance that bubbles formed in the coil will be removed. Accordingly, choking may be present and a worst bubbles will not readily move from their point of origin, thereby adversely affecting cooling of the conductor at precisely the point where maximum cooling is required.

The above noted adverse effects may be overcome by preventing the formation of bubbles. This is provided by introducing spring loaded bellows means 20. The dewar 11 and pipes 13 and 14 are filled with helium to the desired pressure and valves 15 and 17 closed (or pipes 13 and 14 pinched off in the absence of valves). Provision of a suitable spring for loading the bellows in well known manner will permit the desired pressure to be maintained within dewar 11 for the operating period which experience shows can be at least one or more days. The bellows means 20 also functions to maintain the required pressure should the liquid change phase. Maintenance of the pressure above the critical pressure of helium (2.26 atmospheres) will cause helium gas in the dewar to condense as long as the critical temperature (5.19° K.) is not exceeded. When the temperature of liquid helium exceeds its critical temperature, the helium will merely go into its gas phase.

A specific example of one superconducting magnet made in accordance with the present invention follows.

A small superconducting coil was constructed and placed inside a stainless steel tube which was adapted to serve as a pressure vessel. The tube with the coil was immersed in a bath of liquid helium and supplied with helium gas. Initially, on immersing the stainless steel tube containing the coil, the warm helium gas from the gas supply condensed on the metal walls of the tube in contact with the helium bath. Subsequently, a coolant liquid level was established inside the tube and the pressure was increased to the desired level by means of a regulator in a vent pipe, such as for example regulator 17. The helium gas was supplied by means of an inlet pipe and a regulator, such as for example regulator 15. The temperature was measured by means of a carbon resistor situated directly above the magnet.

Tests consisted of measuring the critical current of the coil and the temperature at pressures ranging from 1.0 to 3.0 atmospheres, absolute. The coil was heavily wrapped with mylar tape in order to insure good electrical insulation when mounted inside the pressure tube. This wrapping resulted in a poor heat transfer environment. The most significant result revealed by the tests was that such a heat transfer environment which is inherently poor and which resulted in poor operation of the magnet at atmospheric pressure was significantly improved by increasing the pressure in the tube. By changing only one variable in the system, i.e., the pressure, the critical current of the magnet was increased from 47 amperes at atmospheric pressure to 95.5 amperes at between 2 and 3 atmospheres. As may now readily be seen, the relatively small increase in pressure over atmospheric pressure resulted in an almost one hundred percent increase in current. At the lowest pressure of 1.2 atmospheres used with the magnet inside the pressure tube, the initial temperature was 7.0° Kelvin whereas at greater pressures the initial temperature dropped to 4.2° Kelvin. In order to confirm this difference in temperature, the magnet was removed from the pressure tube and operated in an open bath of liquid helium at 1 atmosphere with the mylar insulating tape still in place. In this test, the critical current was 63 amperes. Subsequently, this test was repeated with the mylar tape removed and the critical current increased to 92.5 amperes. As will now be seen, even the best cooling obtainable with the magnet at 1 atmosphere was not even as good as that when the magnet was operated at a pressure above the critical point of the liquid helium and this with the unit still wrapped in tape.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:
1. A superconducting magnet comprising:
 (a) a plurality of turns of a superconductive wire comprising a coil;
 (b) first means for coupling said wire to a power source;
 (c) dewar means closed to the ambient atmosphere, said dewar surrounding said coil having coolant inlet means for receiving liquid helium for reducing the temperature of said coil to a fixed temperature below the critical temperature of said wire, said dewar further having coolant outlet means;
 (d) second means for controlling the pressure inside said dewar to provide a pressure greater than the critical pressure of liquid helium and
 (e) bellows means in communication with said liquid helium for continuously maintaining said pressure inside said dewar constant.

2. The combination as defined in claim 1 wherein said pressure is not less than about 2.26 and not more than about 3.0 atmospheres.

3. In the method of operating a superconducting magnet immersed in liquid helium disposed in a dewar closed to the ambient atmosphere for reducing the temperature of said magnet to a temperature below its critical temperature, the steps comprising:
 (a) restricting the flow from said dewar of gaseous helium resulting from vaporization of said liquid helium to maintain the pressure in said dewar greater than the critical pressure of liquid helium; and
 (b) supplying current to said magnet.

4. The method as defined in claim 3 wherein the pressure in said dewar is maintained in the range of about 2.26 to about 3.0 atmospheres.

References Cited

UNITED STATES PATENTS

| 3,390,541 | 7/1968 | Johnson et al. | 62—217 |
| 3,195,620 | 7/1965 | Steinhardt. | |
| 3,133,144 | 5/1964 | Cottingham et al. | 335—216 XR |
| 3,129,359 | 4/1964 | Kunzler | 317—123 |

BERNARD A. GILHEANY, Primary Examiner

D. M. MORGAN, Assistant Examiner

U.S. Cl. X.R.

62—217